(12) United States Patent
Hsu et al.

(10) Patent No.: US 6,390,483 B1
(45) Date of Patent: May 21, 2002

(54) FOLDING DEVICE FOR SCOOTER

(75) Inventors: Chen-Rong Hsu, Taichung Hsien (TW); Jenn-Jia Shu, El Monte, CA (US)

(73) Assignees: Hao Yih Trading Co., Ltd., Taichung Hsien (TW); Zenital Inc., El Monte, CA (US)

( * ) Notice: Subject to any disclaimer, the term of this patent is extended or adjusted under 35 U.S.C. 154(b) by 0 days.

(21) Appl. No.: 09/619,274

(22) Filed: Jul. 19, 2000

(51) Int. Cl.$^7$ ................................................ B62M 1/00
(52) U.S. Cl. .............................. 280/87.041; 280/87.05; 403/98
(58) Field of Search .................... 280/87.01, 87.021, 280/87.041, 87.05, 639, 20, 200, 655, 655.1, 14.27; 403/325, 322.4, 321, 326, 100, 98, 83, 84; 16/900, 438

(56) References Cited

U.S. PATENT DOCUMENTS

| | | | | |
|---|---|---|---|---|
| 5,807,007 A | * | 9/1998 | Stemper | 403/13 |
| 6,053,525 A | * | 4/2000 | Lin | 280/642 |
| 6,120,044 A | * | 9/2000 | Tsai | 280/87.05 |
| 6,173,976 B1 | * | 1/2001 | Lee | 280/87.05 |
| 6,179,307 B1 | * | 1/2001 | Mao | 280/87.041 |
| 6,182,988 B1 | * | 2/2001 | Wu | 280/87.05 |
| 6,206,387 B1 | * | 3/2001 | Tsai | 280/87.041 |
| 6,217,058 B1 | * | 4/2001 | Wang et al. | 280/655.1 |
| 6,234,501 B1 | * | 5/2001 | Chen | 280/87.05 |

* cited by examiner

Primary Examiner—Lanna Mai
Assistant Examiner—Kelly E. Campbell
(74) Attorney, Agent, or Firm—Rosenberg, Klein & Lee

(57) ABSTRACT

A folding device for a scooter includes a base plate, a head tube, a handlebar stem, a support rod, and a support base. The support base includes a first side plate and a second side plate, an arcuate slide track defined in the first side plate, and a first locking hole and a second locking hole respectively defined in the second side plate. The support rod includes a transverse tube pivotally mounted between the first side plate and the second side plate and a receiving chamber located above the transverse tube for receiving a support tube. A pull rod is slidably mounted in the support tube and has a first end provided with an outer thread slidably mounted in the slide track and engaged with a pull knob and a second end provided with an enlarged head detachably received in the first locking hole or the second locking hole. A guard plate is mounted for supporting the support rod, and a retaining piece is pivotally mounted on the guard plate for retaining the support rod.

2 Claims, 8 Drawing Sheets

FOLDING DEVICE FOR SCOOTER

BACKGROUND OF THE INVENTION

1. Field of the Invention

The present invention relates to a folding device for a scooter.

2. Description of the Related Art

A conventional scooter in accordance with the prior art shown in FIGS. 1 and 2 comprises an elongated base plate 1, a head tube 12, a handlebar stem 13, two side plates 10 each secured on the front end of the base plate 1, and a support rod 14 having an upper end secured on the head tube 12 and a lower end pivotally mounted between the two side plates 10. Each of the two side plates 10 defines a sector-shaped guide track 11 having a first end defining a first recess 111 and a second end defining a second recess 112. A positioning axle 141 is mounted on the support rod 14 and is detachably received in the first recess 111 or the second recess 112. A drive lever 142 is pivotally mounted on the support rod 14 for moving the positioning axle 141 between a first position where the positioning axle 141 is secured in the first recess 111 so that the support rod 14 is disposed in an upstanding manner, thereby fully expanding the scooter, and a second position where the positioning axle 141 is secured in the second recess 112 so that the support rod 14 is disposed in a horizontal manner, thereby folding the scooter.

However, the dimension of each of the first recess 111 and the second recess 112 is larger than the outer diameter of the positioning axle 141 so that the positioning axle 141 cannot be rigidly secured in the first recess 111 and the second recess 112. In such a manner, the positioning axle 141 is easily detached from the first recess 111 due to a shock or vibration to unfold the scooter, thereby injuring the safety of the user.

SUMMARY OF THE INVENTION

In accordance with one aspect of the present invention, there is provided a folding device for a scooter comprising: an elongated base plate, a head tube, a handlebar stem, a support rod mounted between the head tube and the base plate, and a support base mounted between the support rod and the base plate, wherein, the support base includes a first side plate and a second side plate spaced from the first side plate, an arcuate slide track defined in the first side plate and having a first end defining a first insert hole and a second end defining a second insert hole, a first through hole defined in the first side plate, a first locking hole defined in the second side plate and aligning with the first insert hole, a second locking hole defined in the second side plate and aligning with the second insert hole, and a second through hole defined in the second side plate and aligning with the first through hole;

the support rod includes a bottom end provided with a transverse tube located between the first side plate and the second side plate and defining a receiving chamber located above the transverse tube for receiving therein a support tube which is rested between the first side plate and the second side plate;

a positioning axle extending through the first through hole of the first side plate, the transverse tube of the support rod, and the second through hole of the second side plate so that the support rod is pivotally mounted on the support base;

a pull rod slidably mounted in the support tube and having a first end provided with an outer thread extending outward from the slide track of the first side plate to be engaged with a pull knob which protrudes outward from the slide track of the first side plate and a second end provided with an enlarged head extending outward from the support tube and detachably received in the first locking hole or the second locking hole, and a spring mounted on the pull rod and biased between the pull knob and the enlarged head;

a guard plate mounted between the first side plate and the second side plate for supporting the support rod, the guard plate having a first side provided with a first axle and a second side provided with a second axle defining a screw hole;

a retaining piece defining an arcuate recess for retaining the support rod and having a first end pivotally mounted on the first axle and a second end defining a cut; and a threaded insert rod extending through a guard pad and the cut of the retaining piece, and screwed into the screw hole of the second axle, and a positioning handle pivotally mounted on the insert rod.

Further benefits and advantages of the present invention will become apparent after a careful reading of the detailed description with appropriate reference to the accompanying drawings.

DETAILED DESCRIPTION OF THE INVENTION

Figure 1:
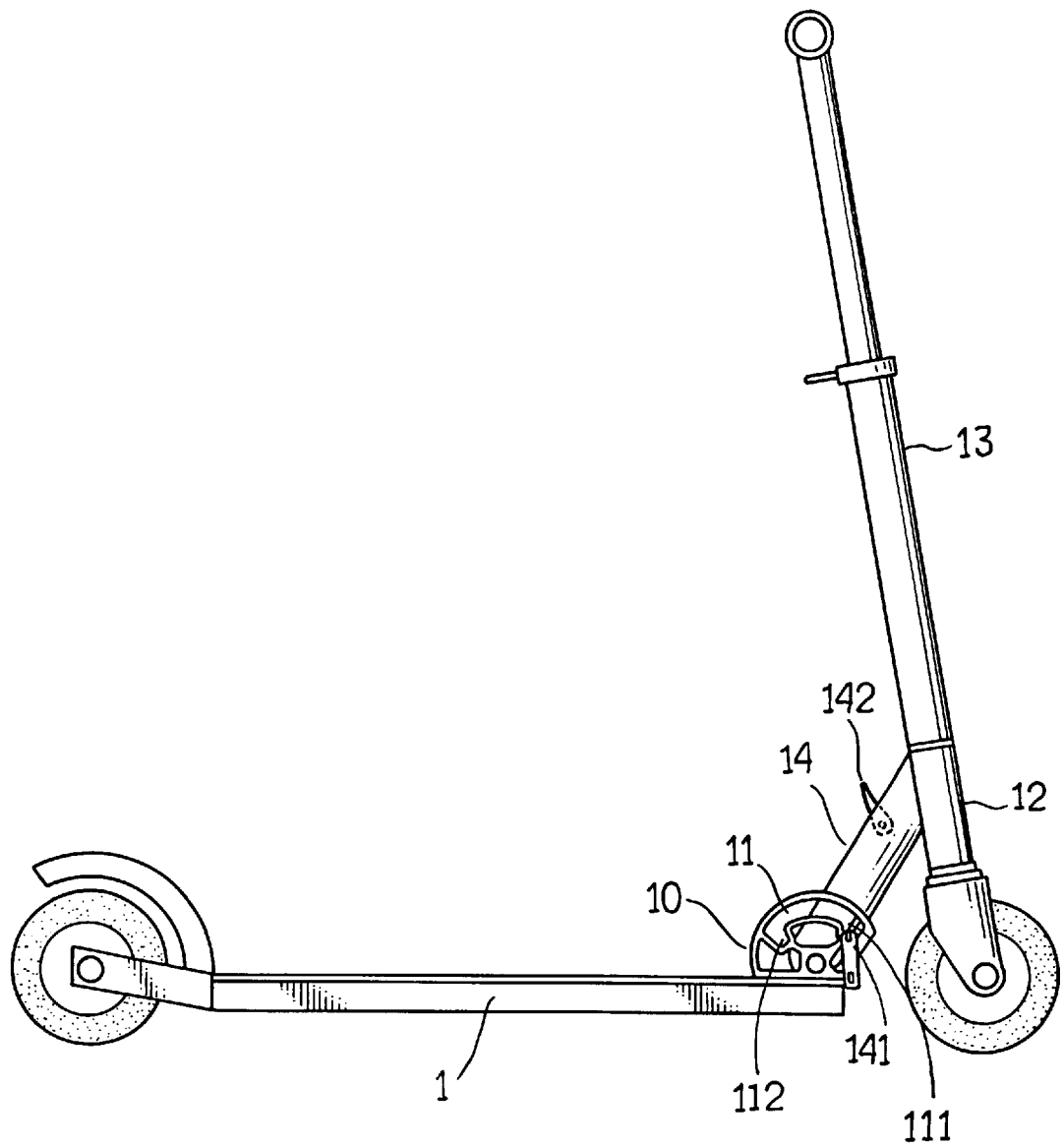
FIG. 1 is a side plan view of a conventional scooter in accordance with the prior art.
Figure 2:
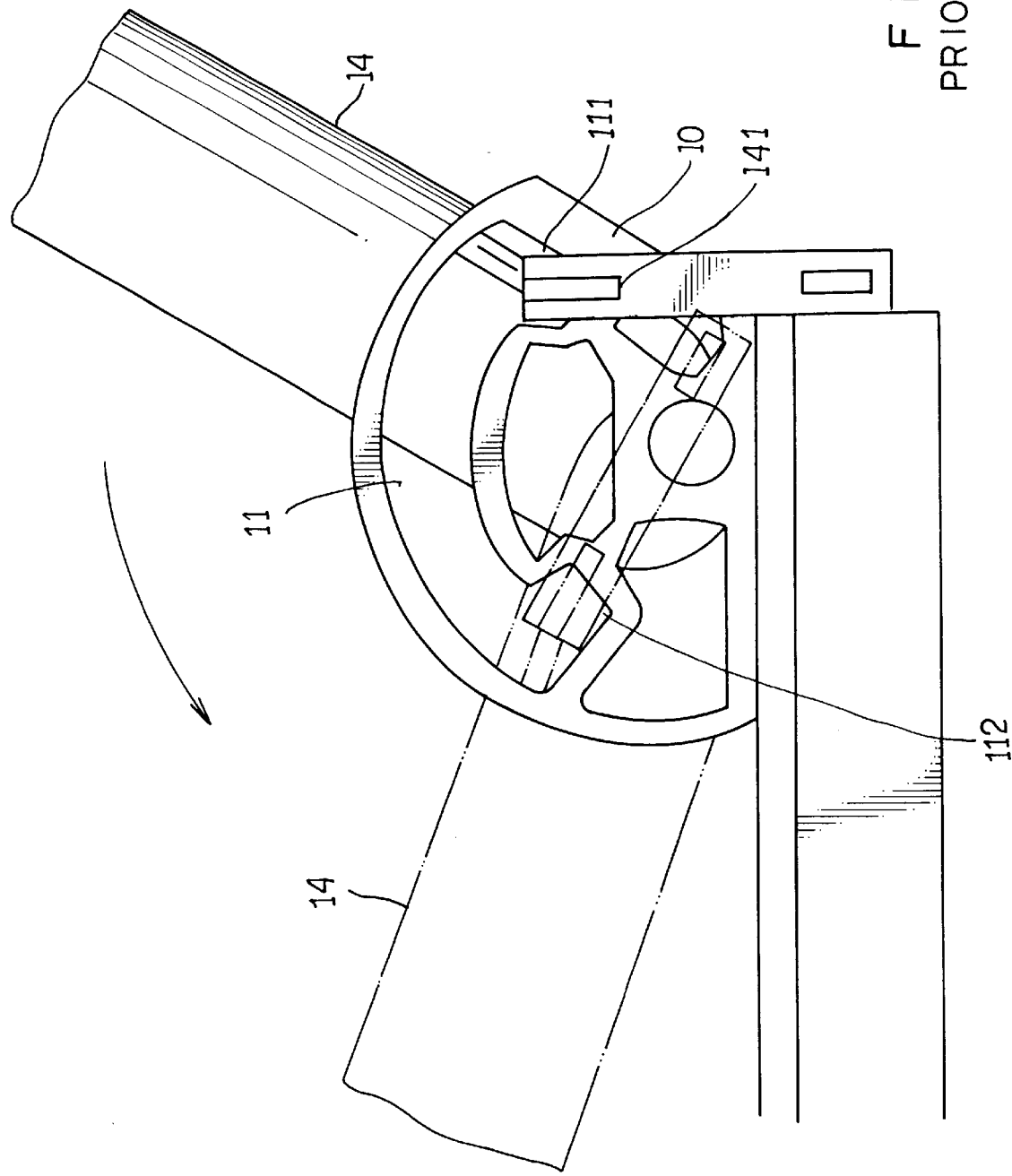
FIG. 2 is a partially enlarged view of the conventional scooter as shown in FIG. 1.
Figure 3:
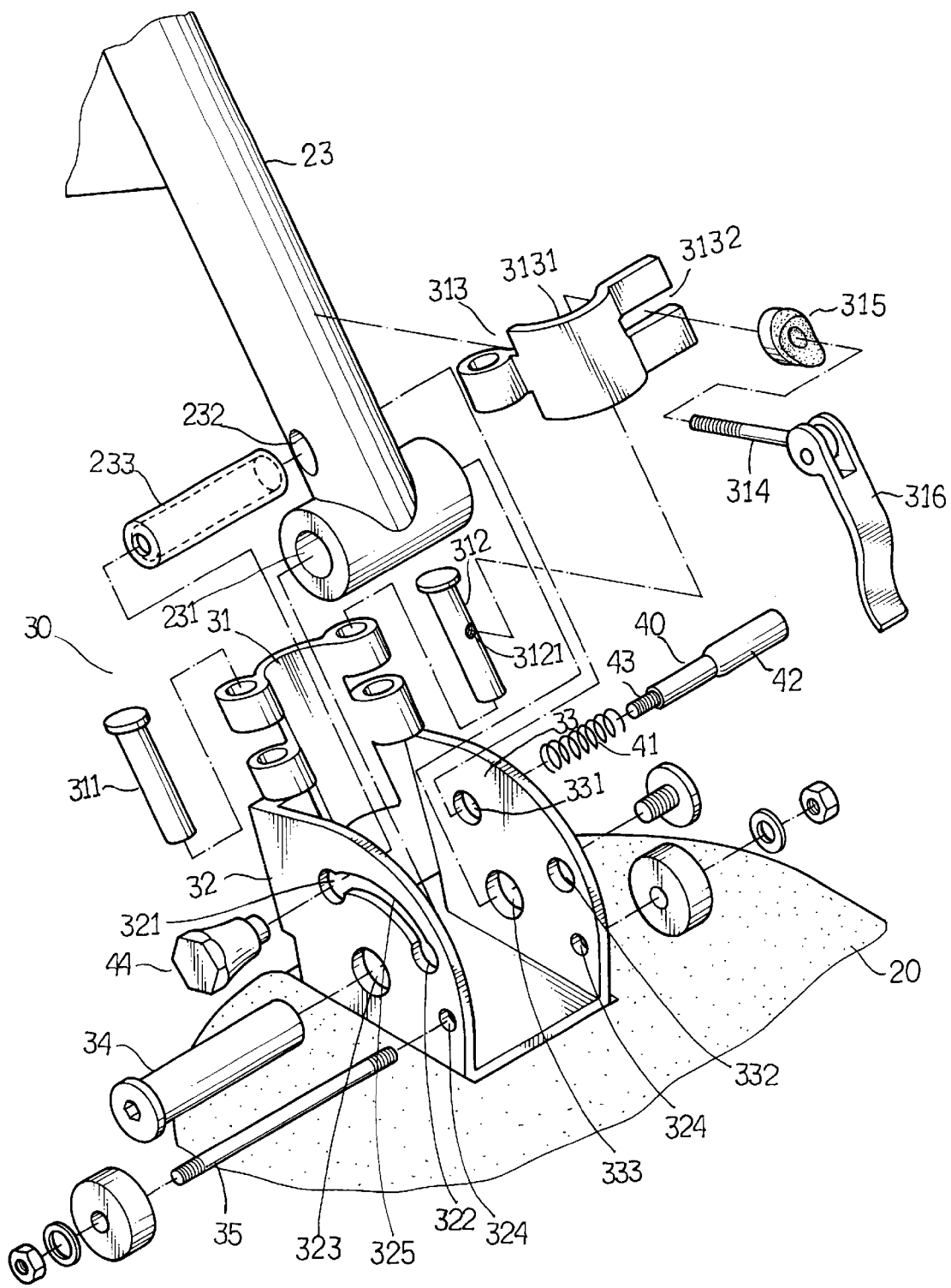
FIG. 3 is an exploded view of a folding device for a scooter in accordance with the present invention.
Figure 4:
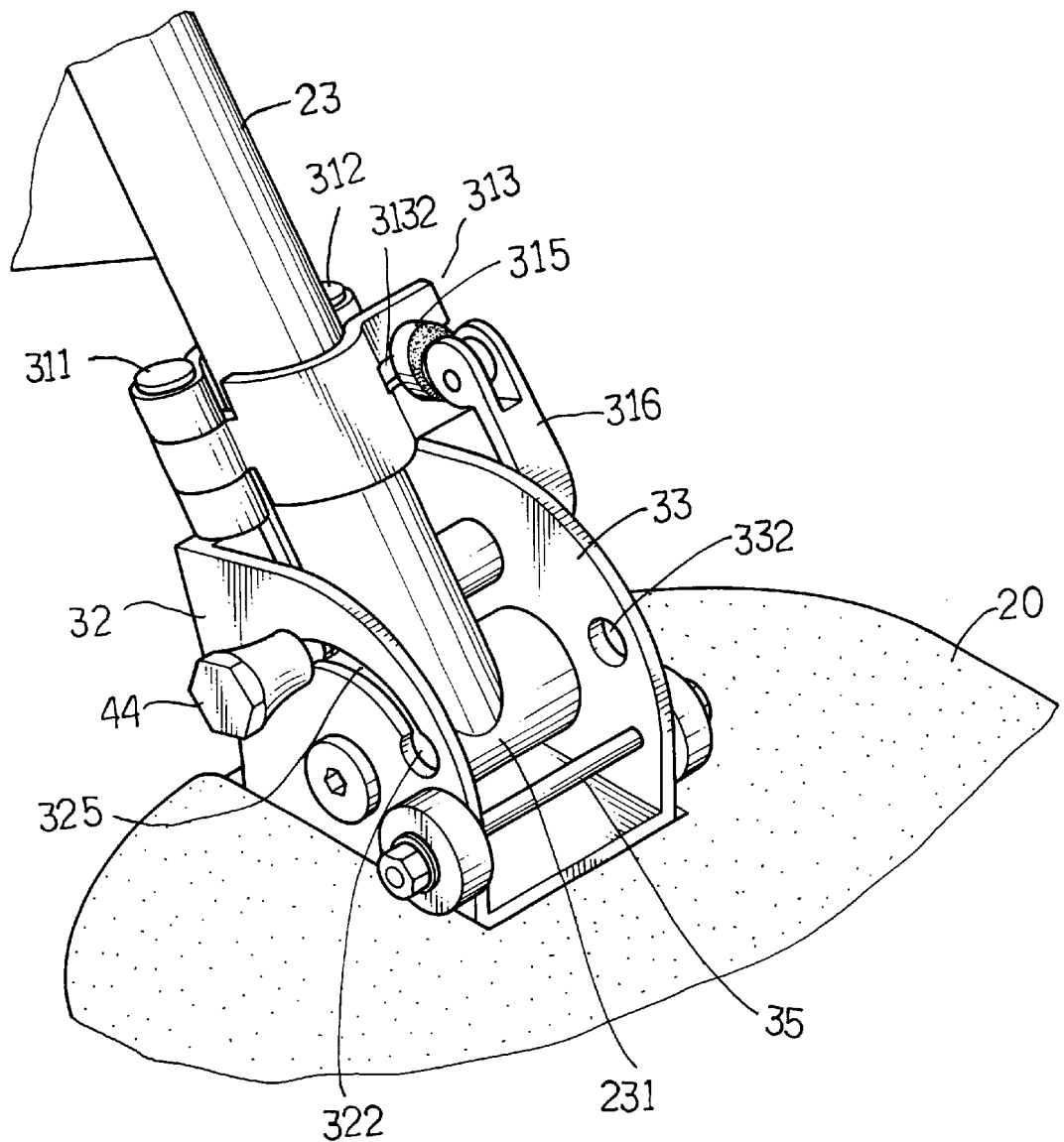
FIG. 4 is a perspective assembly view of the folding device as shown in FIG. 3.
Figure 5:
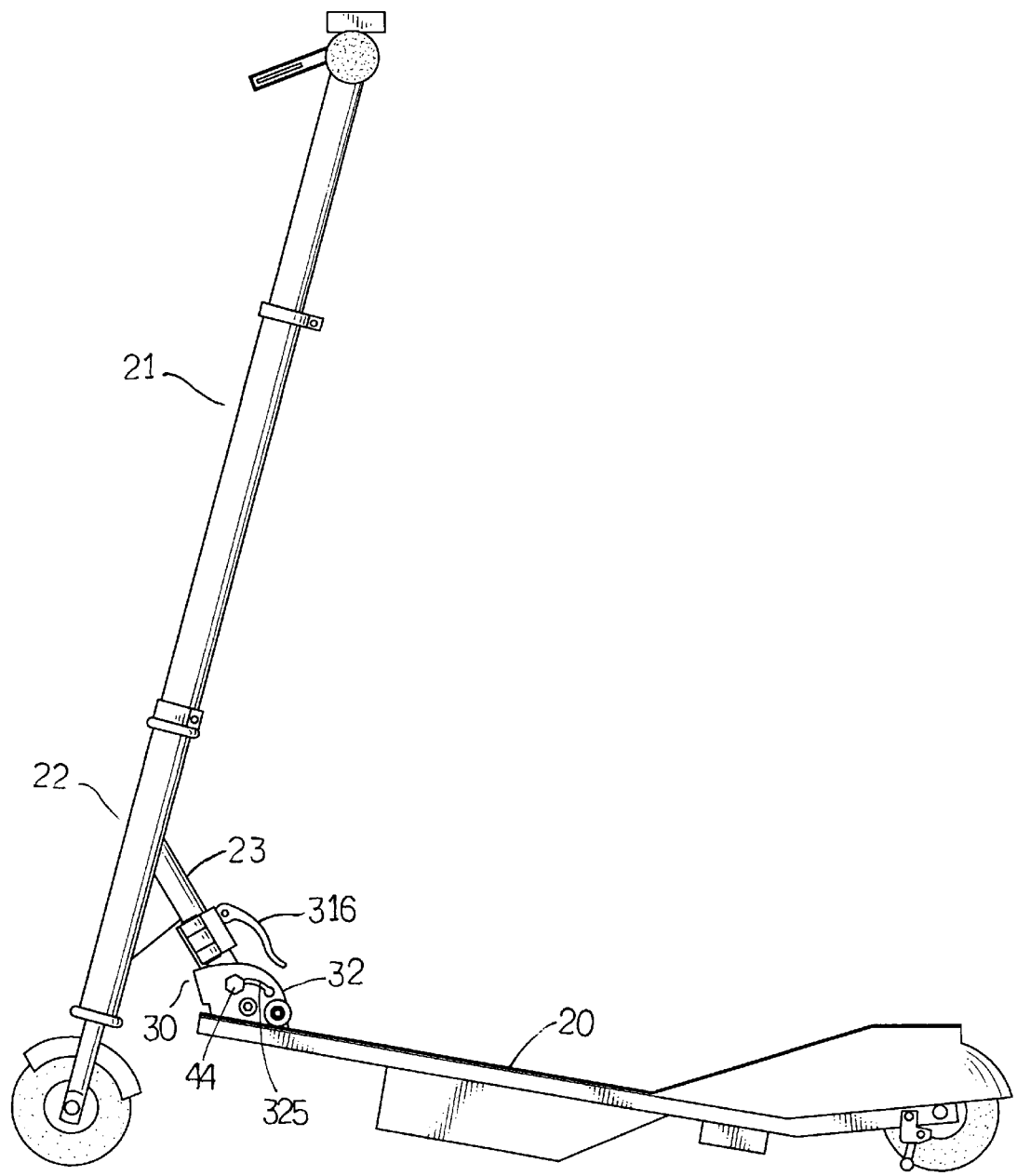
FIG. 5 is a side plan assembly view of the folding device as shown in FIG. 3.
Figure 6:
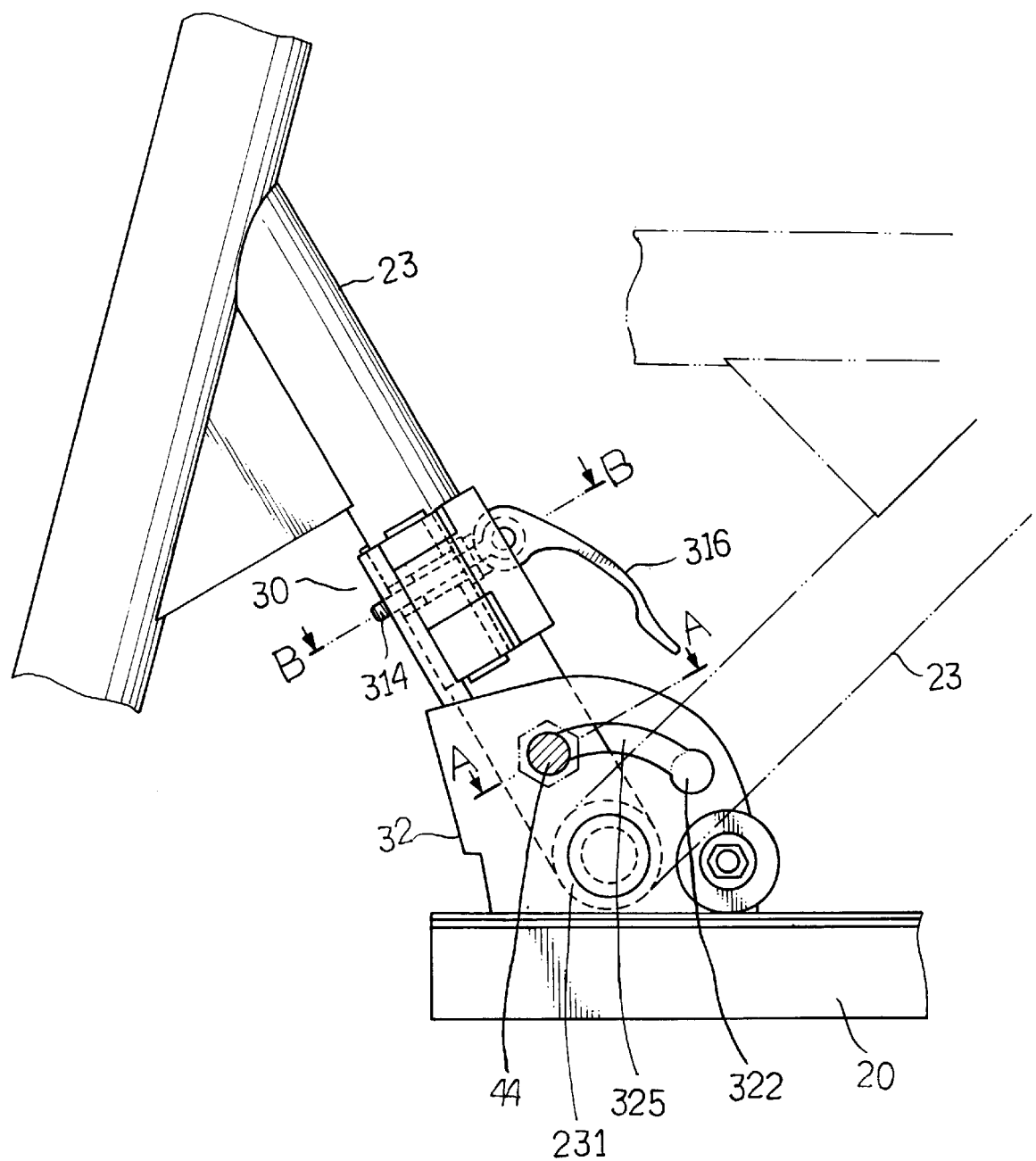
FIG. 6 is an operational view of the folding device as shown in FIG. 5.
Figure 7:
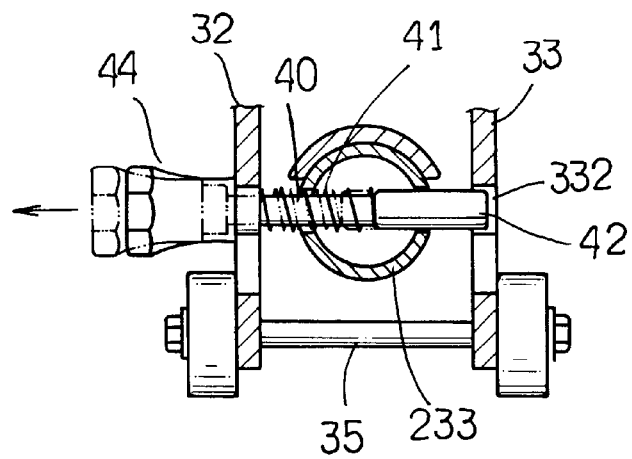
FIG. 7 is a front plan partially cut-away cross-sectional assembly view of the folding device as shown in FIG. 3.
Figure 8:
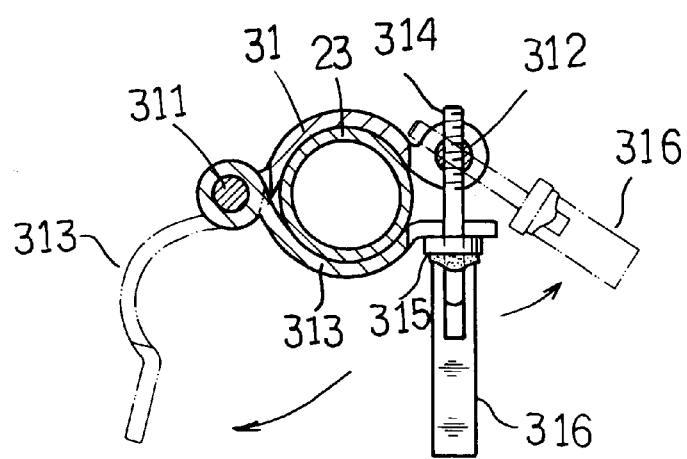
FIG. 8 is a top plan cross-sectional assembly view of the folding device as shown in FIG. 3.

Referring to the drawings and initially to FIGS. 3–5, a folding device for a scooter in accordance with the present invention comprises an elongated base plate 20, a head tube 22, a handlebar stem 21, a support base 30 secured on the front end of the base plate 20, and a support rod 23 having an upper end secured on the head tube 22 and a lower end pivotally mounted on the base plate 20.

The support base 30 includes a first side plate 32 and a second side plate 33 spaced from the first side plate 32, an arcuate slide track 325 defined in the first side plate 32 and having a first end defining a first insert hole 321 and a second end defining a second insert hole 322, a first through hole 323 defined in the first side plate 32, a first locking hole 331 defined in the second side plate 33 and aligning with the first insert hole 321, a second locking hole 332 defined in the second side plate 33 and aligning with the second insert hole 322, and a second through hole 333 defined in the second side plate 33 and aligning with the first through hole 323.

The bottom end of the support rod 23 is provided with a transverse tube 231 located between the first side plate 32 and the second side plate 33 and defining a receiving chamber 232 located above the transverse tube 231 for receiving therein a support tube 233 which is rested between the first side plate 32 and the second side plate 33.

A positioning axle 34 in turn extends through the first through hole 323 of the first side plate 32, the transverse tube 231 of the support rod 23, and the second through hole 333 of the second side plate 33 so that the lower end of the support rod 23 is pivotally mounted on the support base 30.

A pull rod 40 is slidably mounted in the support tube 233 and includes a first end provided with an outer thread 43 extending outward from the slide track 325 of the first side plate 32 to be engaged with a pull knob 44 which protrudes outward from the slide track 325 of the first side plate 32, and a second end provided with an enlarged head 42 extending outward from the support tube 233 and detachably received in the first locking hole 331 or the second locking hole 332. A spring 41 is mounted on the pull rod 40 and is biased between the pull knob 44 and the enlarged head 42.

The first side plate 32 of the support base 30 defines a first receiving hole 324, the second side plate 33 of the support base 30 defines a second receiving hole 334 aligning with the first receiving hole 324, and the folding device further comprises a limiting axle 35 in turn extending through the first receiving hole 324 of the first side plate 32 and the second receiving hole 334 of the second side plate 33 for limiting a further movement of the support rod 23 when the support rod 23 is pivoted to a horizontal position thereof.

A guard plate 31 is mounted between the first side plate 32 and the second side plate 33 for supporting the support rod 23. The guard plate 31 has a first side provided with a first axle 311 and a second side provided with a second axle 312 defining a screw hole 3121. A retaining piece 313 defines an arcuate recess 3131 for retaining the support rod 23 therein and has a first end pivotally mounted on the first axle 311 and a second end defining a cut 3132. A threaded insert rod 314 in turn extends through a guard pad 315 and the cut 3132 of the retaining piece 313, and is screwed into the screw hole 3121 of the second axle 312, and a positioning handle 316 is pivotally mounted on the insert rod 314.

In operation, referring to FIGS. 5–9 with reference to FIGS. 3 and 4, the unfolding (in use) state and the folding (not in use) state of the folding device for the scooter are described as follows.

First, the scooter is disposed in an unfolding state when in use.

The pull knob 44 is pulled outward to detach the enlarged head 42 of the pull rod 40 from the second locking hole 332 of the second side plate 33 so that the pull rod 40 can be displaced in the slide track 325.

When the pull knob 44 is locked into the first insert hole 321 of the first side plate 32, the pull knob 44 is released to return the pull rod 40 to its original position by the restoring force of the spring 41 so that the enlarged head 42 of the pull rod 40 is locked into the first locking hole 331 of the second side plate 33, thereby locking the pull rod 40 by the first locking hole 331 of the second side plate 33 so that the support rod 23 is secured by the pull rod 40 to be rested on the guard plate 31 of the support base 30 in an upright manner so that the scooter is disposed in an unfolding and expanding state as shown in FIG. 5.

The retaining piece 313 is then pivoted about the first axle 311 to encompass and lock the support rod 23 in the recess 3131. The threaded insert rod 314 then in turn extends through the guard pad 315 and the seat 3132 of the retaining piece 313, and is screwed into the screw hole 3121 of the second axle 312. The positioning handle 316 is then pressed downward to lock the insert rod 314 on the retaining piece 313, thereby securing the support rod 23 by means of the retaining piece 313.

Second, the scooter is disposed in a folding state when not in use.

The positioning handle 316 is pressed upward to unlock the insert rod 314 from the retaining piece 313. The threaded insert rod 314 is then unscrewed from the screw hole 3121 of the second axle 312, and is detached from the seat 3132 of the retaining piece 313 so that the retaining piece 313 can be pivoted outward about the first axle 311 to release the support rod 23 from the recess 3131.

The pull knob 44 is then pulled outward to detach the enlarged head 42 of the pull rod 40 from the first locking hole 331 of the second side plate 33 so that the pull rod 40 can be displaced in the slide track 325.

Figure 9:
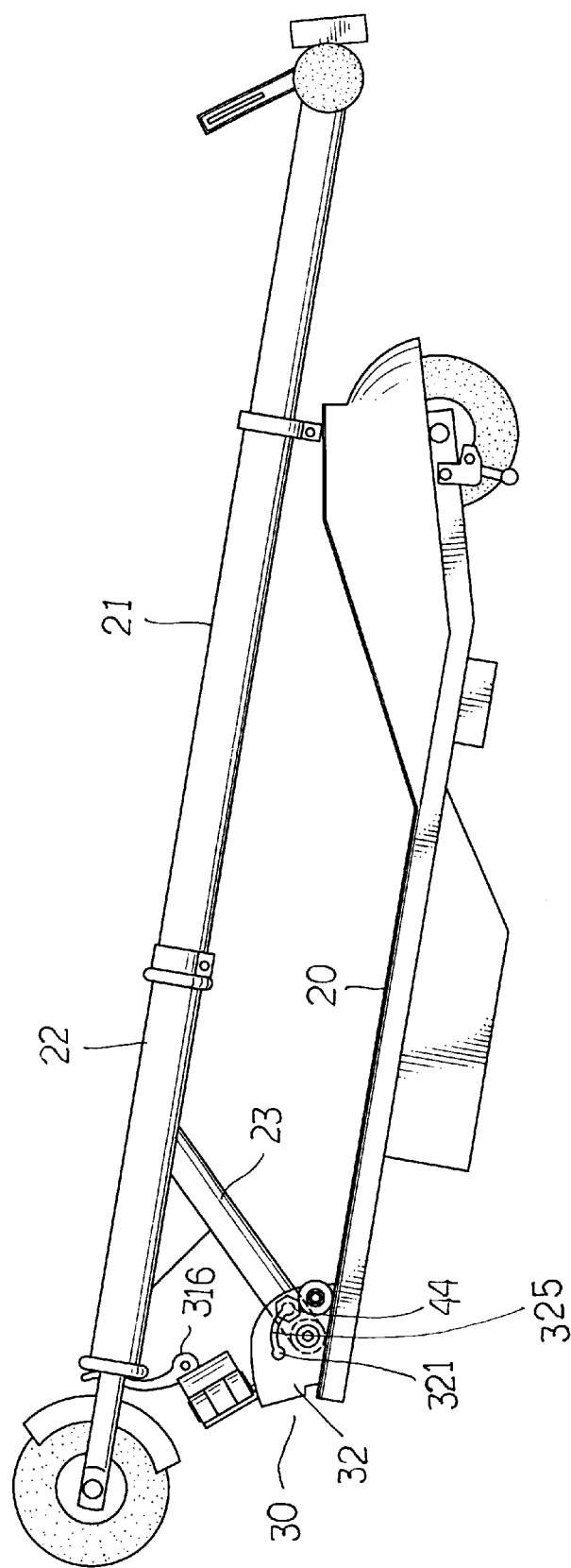
FIG. 9 is an operational view of the folding device as shown in FIG. 5.

When the pull knob 44 is locked into the second insert hole 322 of the first side plate 32, the pull knob 44 is released to return the pull rod 40 to its original position by the restoring force of the spring 41 so that the enlarged head 42 of the pull rod 40 is locked into the second locking hole 332 of the second side plate 33, thereby locking the pull rod 40 by the second locking hole 332 of the second side plate 33 so that the support rod 23 is secured by the pull rod 40 to be rested on the limiting axle 35 of the support base 30 in a horizontal manner so that the scooter is disposed in a folding state as shown in FIG. 9.

It should be clear to those skilled in the art that further embodiments may be made without departing from the scope of the present invention.

What is claimed is:

1. A folding device for a scooter comprising: an elongated base plate (20), a head tube (22), a handlebar stem (21), a support rod (23) mounted between said head tube (22) and said base plate (20), and a support base (30) mounted between said support rod (23) and said base plate (20), wherein, said support base (30) includes a first side plate (32) and a second side plate (33) spaced from said side plate (32), with an arcuate slide track (325) defined in said first side plate (32) and having a first end with a first insert hole (321) formed therein and a second end with a second insert hole (322) formed therein, a first through hole (323) defined in said first side plate (32), a first locking hole (331) defined in said second side plate (33) and aligning with said first insert hole (321), a second locking hole (332) defined in said second side plate (33) and aligning with said second insert hole (322), and a second through hole (333) defined in said second side plate (33) and aligning with said first through hole (323);

said support rod (23) includes a bottom end provided with a transverse tube (231) located between said first side plate (32) and said second side plate (33) and with a receiving chamber (232) formed therein, located above said transverse tube (231) for receiving there in a support tube (233) which is rested between said first side plate (32) and said second side plate (33);

a positioning axle (34) extending through said first through hole (323) of said first side plate (32), said transverse tube (231) of said support rod (23), and said second through hole (333) of said second side plate (33) so that said support rod (23) is pivotally mounted on said support base (30);

a pull rod (40) slidably mounted in said support tube (233) and having a first end provided with an outer thread (43) extending outward from said slide track (325) of said first side plate (32) to be engaged with a pull knob (44) which protrudes outward from said slide track (325) of said first side plate (32) and a second end provided with an enlarged head (42) extending outward from said support tube (233) and detachably received in said first locking hole (331) or said second locking hole (332), and a spring (41) mounted on said pull rod (40) and biased between said pull knob (44) and said enlarged head (42);

a guard plate (31) mounted between said first side plate (32) and said second side plate (33) for supporting said support rod (23), said guard plate (31) having a first side provided with a first axle (311) and a second side provided with a second axle (312) having a screw hole (3121) formed therein;

a retaining piece (313) having an arcuate recess (3131) formed therein, for retaining said support rod (23) and having a first end pivotally mounted on said first axle (311) and a second end defining a slot (3132); and a threaded insert rod (314) extending through a guard pad (315) and said slot (3132) of said retaining piece (313), and screwed into said screw hole (3121) of said second axle (312), and a positioning handle (316) pivotally mounted on said insert rod (314) for selectively locking said support rod between said retaining piece and said guard plate.

2. The folding device in accordance with claim 1, wherein said first side plate (32) of said support base (30) having a first receiving hole formed therein, said second side plate (33) of said support base (30) having a second receiving hole (334) formed therein, aligning with said first receiving hole (324), and said folding device further comprises a limiting axle (35) in turn extending through said first receiving hole (324) of said first side plate (32) and said second receiving hole (334) of said second side plate (33) for limiting a further movement of said support rod (23) when said support rod (23) is pivoted to a horizontal position thereof.

* * * * *